(12) United States Patent
Fukunaga et al.

(10) Patent No.: US 7,523,224 B2
(45) Date of Patent: *Apr. 21, 2009

(54) INFORMATION PROCESSING APPARATUS CONTROL METHOD FOR DEVICE HAVING BOTH FIRST AND SECOND INTERFACE SETTINGS ENABLING THE INFORMATION PROCESSING APPARATUS TO COMMUNICATE WITH THE DEVICE VIA BOTH FIRST AND SECOND INTERFACE

(75) Inventors: Koji Fukunaga, Kanagawa (JP); Atsushi Nakamura, Kanagawa (JP)

(73) Assignee: Canon Kabushiki Kaisha (JP)

(*) Notice: Subject to any disclaimer, the term of this patent is extended or adjusted under 35 U.S.C. 154(b) by 63 days.

This patent is subject to a terminal disclaimer.

(21) Appl. No.: 11/622,288

(22) Filed: Jan. 11, 2007

(65) Prior Publication Data

US 2007/0112980 A1    May 17, 2007

Related U.S. Application Data

(62) Division of application No. 10/869,788, filed on Jun. 16, 2004, now Pat. No. 7,290,067.

(30) Foreign Application Priority Data

| Jun. 20, 2003 | (JP) | ............................. 2003-177042 |
| Jun. 20, 2003 | (JP) | ............................. 2003-177052 |
| Jun. 9, 2004 | (JP) | ............................. 2004-171636 |
| Jun. 9, 2004 | (JP) | ............................. 2004-171637 |

(51) Int. Cl.
*G06F 15/00* (2006.01)
*G05B 23/02* (2006.01)
*B41J 29/00* (2006.01)
*B41J 1/00* (2006.01)

(52) U.S. Cl. .................. 710/8; 710/9; 710/10; 710/62; 710/72; 358/1.15; 340/2.1; 340/310.16

(58) Field of Classification Search ............... 710/8–10, 710/62, 72; 358/1.15; 340/2.1, 310.16
See application file for complete search history.

(56) References Cited

U.S. PATENT DOCUMENTS 5,481,249 A    1/1996    Sato (Continued)

FOREIGN PATENT DOCUMENTS

JP    7-13891 A    1/1995

(Continued)

OTHER PUBLICATIONS

Examination issued in corresponding European patent application No. 04253586.4-2211, dated Jan. 8, 2008.

(Continued)

*Primary Examiner*—Tammara Peyton
(74) *Attorney, Agent, or Firm*—Rossi, Kimms & McDowell LLP

(57) ABSTRACT

An information processing apparatus which makes it easier to carry out setting of a wireless interface necessary for enabling a device or apparatus to be used via the wireless interface, using a wire interface. An information processing apparatus carries out first communication setting so as to enable an apparatus or device to be controlled via a wire interface, communicates with the apparatus or device via the wire interface after the first communication setting to carry out second communication setting for enabling communication with the apparatus or device via a wireless interface. This simplifies the communication setting for enabling communication with the apparatus or device via the wireless interface.

4 Claims, 17 Drawing Sheets

U.S. PATENT DOCUMENTS

| | | | |
|---|---|---|---|
| 5,617,526 A * | 4/1997 | Oran et al. ................. | 715/779 |
| 5,631,637 A | 5/1997 | Ueda | |
| 5,696,499 A | 12/1997 | Mitsuhashi et al. | |
| 5,867,720 A | 2/1999 | Hirano | |
| 6,452,692 B1 * | 9/2002 | Yacoub ..................... | 358/1.15 |
| 6,493,104 B1 | 12/2002 | Cromer et al. | |
| 2002/0103973 A1 | 8/2002 | Zimniewicz | |
| 2002/0188941 A1 | 12/2002 | Cicciarelli et al. | |
| 2003/0048473 A1 | 3/2003 | Rosen | |
| 2003/0090701 A1 | 5/2003 | Crane et al. | |

FOREIGN PATENT DOCUMENTS

| | | |
|---|---|---|
| JP | 2003-50677 A | 2/2003 |

OTHER PUBLICATIONS

Related co-pending U.S. Appl. No. 11/776,119, filed Jul. 11, 2007; Koji Fukunaga et al.; "Information Processing Apparatus, Control Method Therefor, And Program For Implementing The Method", pp. 1-39; Figs. 1-17.

European Search Report for corresponding application EP 04 25 3586.

"Installing and sharing a printer on a Windows 2000 computer with Windows 95,98,98se, or Millenium". Jan. 4, 2003, Winbookcorp Homepage.

* cited by examiner

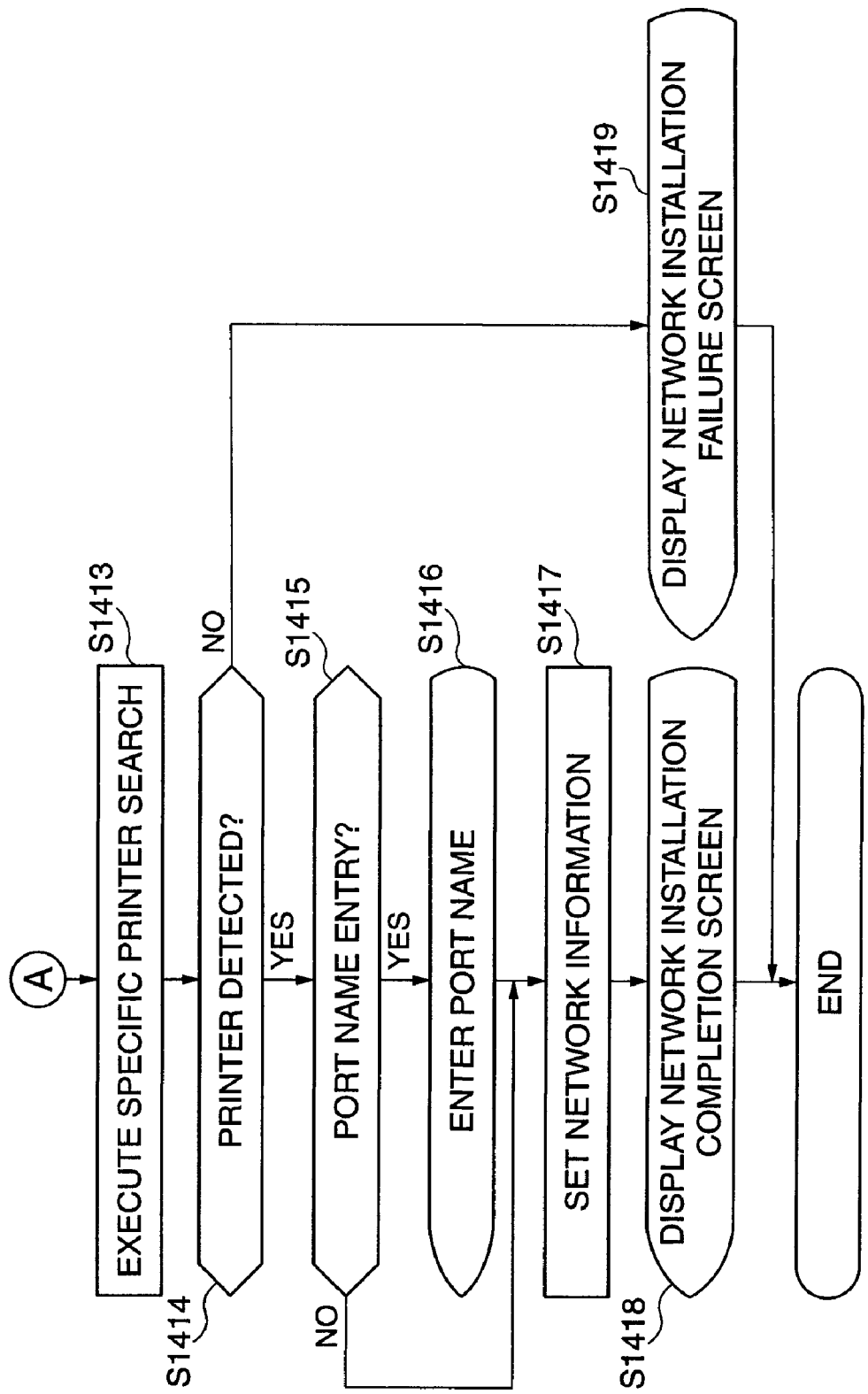

INFORMATION PROCESSING APPARATUS CONTROL METHOD FOR DEVICE HAVING BOTH FIRST AND SECOND INTERFACE SETTINGS ENABLING THE INFORMATION PROCESSING APPARATUS TO COMMUNICATE WITH THE DEVICE VIA BOTH FIRST AND SECOND INTERFACE

This application is a divisional application of U.S. patent application Ser. No. 10/869,788 filed Jun. 16, 2004.

BACKGROUND OF THE INVENTION

1. Field of the Invention

The present invention relates to an information processing apparatus which is capable of communicating with devices or apparatuses having both a wire interface and a wireless interface, and a control method therefor, and a program for implementing the method.

2. Description of the Related Art

In recent years, devices or apparatuses, such as printers and printer adapters, having a wireless interface have been more and more widely used because networks conventionally constructed using wires or cables can be changed into wireless ones which need no wiring or the like. For example, as devices compliant with the IEEE 802.11b standard for wireless interfaces, there have been proposed wireless LAN access points and wireless LAN routers.

A printer connectible to a wireless LAN, as a device with the above-mentioned wireless interface, needs no wiring or the like, and can be shared by a plurality of PCs. Therefore, even in homes, for example, it is possible to meet the needs of carrying out printing from a plurality of PCs, using a single printer (refer to e.g. Japanese Laid-Open Patent Publications No. H07-013891 and No. 2003-050677).

However, when a wireless LAN is used, differently from the case where a wire LAN is used, it is difficult to make sure whether a printer is properly connected to the LAN. For this reason, for example, in setting up a wireless LAN, there is a fear of the setup operation being carried out and terminated in spite of actual failure in connection.

Further, in the case where printers are shared for use by a plurality of PCs, a method is employed in which the second and subsequent PCs to be connected to the printers search the wireless LAN for the printers, and a desired one of the detected printers is selected by a user. However, when a PC cannot properly find a printer via the wireless LAN, or when a plurality of printers are found, the user often has to carry out a complicated operation, which is liable to cause an erroneous operation. Moreover, in an environment where a plurality of printers of the same type are connected to the wireless LAN, the user has difficulty in finding a desired printer.

SUMMARY OF THE INVENTION

It is a first object of the present invention to provide an information processing apparatus and a control method therefor, which make it easier to carry out setting of a wireless interface necessary for enabling a device or apparatus to be used via the wireless interface, using a wire interface, and a program for implementing the control method.

It is a second object of the present invention to provide an information processing apparatus and a control method therefor, which are capable of preventing a user from erroneously using an unintended interface (i.e. a second interface), by deleting a communication setting for the second interface, for example, a port instance corresponding to the second interface, when carrying out setting of a first interface necessary for enabling a device or apparatus to be used via the first interface, using the second interface, irrespective of whether the first and second interfaces are wireless interfaces or wire interfaces, and a program for implementing the control method.

To attain the above first object, in a first aspect of the present invention, there is provided an information processing apparatus communicatable with at least one device or apparatus having a wire interface and a wireless interface, comprising a first communication setting-executing device that executes first communication setting for enabling the device or apparatus to be controlled via the wire interface, and a second communication setting-executing device that communicates with the device or apparatus via the wire interface after execution of the first communication setting, to execute second communication setting for enabling the information processing apparatus to communicate with the device or apparatus via the wireless interface.

With the arrangement of the information processing apparatus according to the first aspect of the present invention, communication setting for enabling communication with a device or apparatus by using a wireless interface can be achieved more easily by using a wire interface.

Preferably, the second communication setting-executing device comprises a connection checking device that checks, via the wireless interface, whether or not connection of the information processing apparatus to the device or apparatus has been established during execution of the second communication setting.

With the arrangement of this preferred embodiment, communication setting is completed only when establishment of connection to the device or apparatus is confirmed by actually checking connection to the wireless interface. This makes it possible to avoid the inconvenience that the communication setting is completed in spite of actual failure in connection.

Preferably, the second communication setting-executing device acquires communication setting information required to execute the second communication setting, via the wire interface.

Preferably, the second communication setting-executing device transmits a command for setting communication setting information required to execute the second communication setting, via the wire interface.

Preferably, the information processing apparatus further comprises a generation device that is responsive to an instruction from a user for generating one or both of an icon corresponding to the first communication setting and an icon corresponding to the second communication setting.

Preferably, the information processing apparatus further comprises a prompting device that prompts a user to confirm whether the second communication setting is to be executed after execution of the first communication setting, and the second communication setting-executing device is responsive to confirmation by the user that the second communication setting is to be executed, for starting the second communication setting.

Preferably, the information processing apparatus further comprises a deletion device that deletes information set by the first communication setting.

To attain the above first object, in a second aspect of the present invention, there is provided a method of controlling an information processing apparatus communicatable with at least one device or apparatus having a wire interface and a wireless interface, comprising an installation step of installing a device driver as software for enabling the device or apparatus to be controlled via the wire interface, in the information processing apparatus, and a setting processing step of communicating with the device or apparatus via the wire interface after installation of the device driver, to execute setting processing for enabling the device or apparatus and the information processing apparatus to communicate with each other via the wireless interface.

To attain the above first object, in a third aspect of the present invention, there is provided a method of controlling an information processing apparatus communicatable with at least one device or apparatus having a wire interface and a wireless interface, comprising an installation step of installing a device driver as software for enabling the device or apparatus to be controlled via the wire interface, in the information processing apparatus, an acquisition step of causing the information processing apparatus to acquire setting information on the wireless interface already set to the device or apparatus, via the wire interface, after installation of the device driver, and a setting processing step of executing a wireless interface setting process for enabling the device or apparatus and the information processing apparatus to communicate with each other via the wireless interface, based on the acquired setting information on the wireless interface.

With the arrangement of the method of controlling the information processing apparatus according to the third aspect of the present invention, communication setting of a wireless interface to each of second and subsequent information processing apparatus can be performed easily via a wire interface as in the first information processing apparatus, and therefore it is possible to unify user operations, thereby suppressing erroneous operation in the communication setting.

To attain the above first object, in a fourth aspect of the present invention, there is provided a control program for executing a method of controlling an information processing apparatus communicatable with at least one device or apparatus having a wire interface and a wireless interface, comprising a first communication setting-executing module for executing first communication setting for enabling the device or apparatus to be controlled via the wire interface, and a second communication setting-executing module for communicating with the device or apparatus via the wire interface after execution of the first communication setting, to execute second communication setting for enabling the information processing apparatus to communicate with the device or apparatus via the wireless interface.

To attain the above second object, in a fifth aspect of the present invention, there is provided an information processing apparatus communicatable with at least one device or apparatus having a first interface and a second interface, comprising a first communication setting-executing device that executes first communication setting for enabling the device or apparatus to be controlled via the first interface, a second communication setting-executing device that communicates with the device or apparatus via the first interface after execution of the first communication setting, to execute second communication setting for enabling the information processing apparatus to communicate with the device or apparatus via the second interface, and a deletion device that deletes information set by the first communication setting, after execution of the second communication setting.

With the arrangement of the information processing apparatus according to the fifth aspect of the present invention, irrespective of whether an interface is a wire one or a wireless one, when setting of a first interface necessary for enabling a device or apparatus to be used via the first interface is carried out by using a second interface, communication setting for the second interface is deleted, whereby it is possible to prevent a user from erroneously using an unintended interface, as well as from being confused due to unnecessary display of an icon corresponding to the second interface.

Preferably, the information processing apparatus further comprises a display device that displays a display screen for prompting a user to confirm whether the second communication setting is to be executed after execution of the first communication setting by the first communication setting-executing device.

Preferably, the deletion device deletes an icon corresponding to the first communication setting after execution of the second communication setting.

To attain the above second object, in a sixth aspect of the present invention, there is provided a method of controlling an information processing apparatus communicatable with at least one device or apparatus having a first interface and a second interface, comprising an installation step of installing a device driver as software for enabling the device or apparatus to be controlled via the first interface, in the information processing apparatus, a setting processing step of communicating with the device or apparatus via the first interface after installation of the device driver, to execute setting processing for enabling the device or apparatus and the information processing apparatus to communicate with each other, and a deletion step of deleting information associated with the device driver after execution of the setting processing in the setting processing step.

The above and other objects, features, and advantages of the invention will become more apparent from the following detailed description taken in conjunction with the following drawings.

BRIEF DESCRIPTION OF THE DRAWINGS

FIGS. 8A to 8C are views showing a first sequence of screens displayed during execution of a wireless network installation process using the USB interface;

FIG. 16 is a continued part of the flowchart in FIG. 15; and

DETAILED DESCRIPTION OF THE PREFERRED EMBODIMENTS

The present invention will now be described in detail below with reference to the accompanying drawings showing a preferred embodiment thereof.

Figure 1:
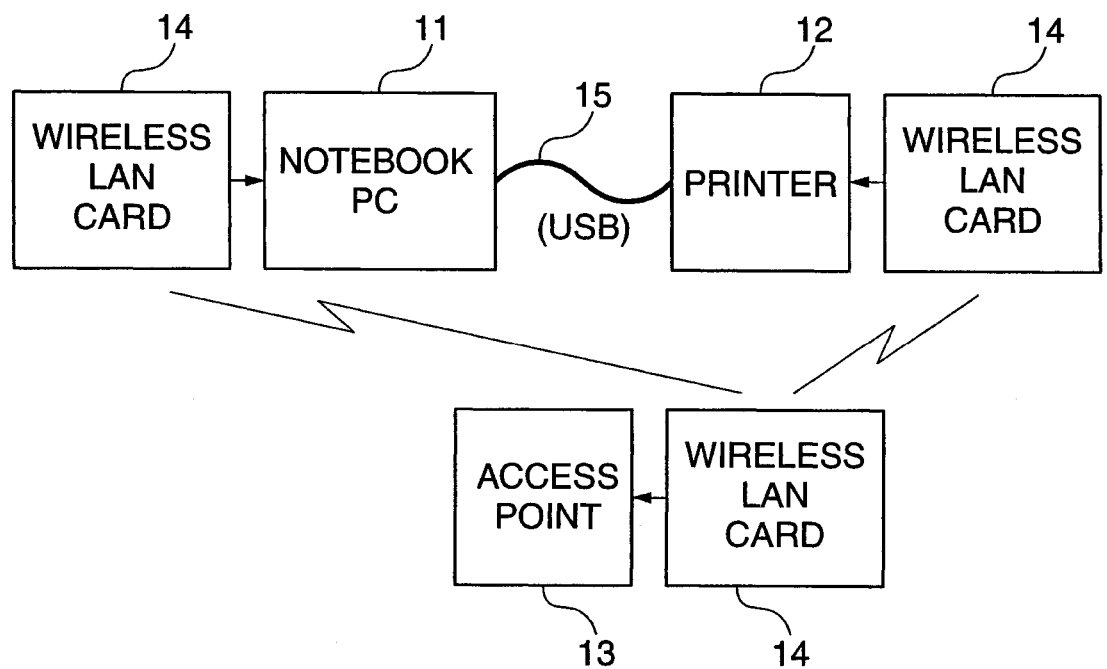
FIG. 1 is a block diagram schematically showing the arrangement of an information processing system including an information processing apparatus according to an embodiment of the present invention.

FIG. 1 is a block diagram schematically showing the arrangement of an information processing system including an information processing apparatus according to an embodiment of the present invention.

A notebook PC (information processing apparatus) appearing in FIG. 1 is adapted to use a USB cable 15 as a wire interface and have a PCMCIA card-type wireless LAN card 14 mounted therein as a wireless interface. Similarly to the PC 11, a printer 12 is equipped with a wire interface and a wireless interface. The connection of the PC 11 and the printer 12 by the USB cable 15 provides wire interfacing. The mounting of the PCMCIA card-type wireless LAN cards 14 in the PC 11 and the printer 12 provides wireless interfacing. An access point 13 is for wireless interfacing, and functions as an intermediate between wireless devices or apparatuses. A PCMCIA card-type wireless LAN card 14 can be mounted in the access point 13.

Print data can be sent from the PC 11 to the printer 12 using the USB cable 15 as well as via the access point 13 by wireless interface. Although the single PC 11 alone is shown in FIG. 1, a plurality of PCs can be connected to a single access point to share a single printer for use.

A wireless LAN has a mode which enables connection to a plurality of LAN devices via an access point of the wireless LAN, and the mode is called "the infrastructure mode". In the infrastructure mode, the same ID (SSID) that is set to the access point is set to the LAN devices, whereby a LAN can be formed by the wireless LAN devices connected via the access point. When a printer is used in a wireless LAN, it is necessary to set the printer such that the printer can be connected to the access point. In the present embodiment, it is assumed that settings have already been established between the PC 11 and the access point 13 such that the PC II can communicate with the access point 13 in the infrastructure mode, whereas the printer 12 is in an initial state where settings for connection to the wireless LAN have not been established yet, and the ID for the infrastructure mode has not been set thereto.

The PC 11 operates on an OS (operating system), and a user needs to install printing software (printer driver) in the PC 11 in order to carry out printing in this OS environment. Further, when the wireless LAN is used for printing, the user has to set up the printer 12 for the wireless LAN to make the printer 12 connectible to the access point 13, and then install software for enabling printing through the wireless LAN in the PC 11. In this case, the user needs to configure the settings of the software that enables printing by the wireless LAN, such that the PC is suitable for the printer.

For clarity of the outlines of the present embodiment, first, a description will be given of installation of the printer driver.

To connect a printer, such as the printer 12, to a host computer, such as the PC 11, and enable the printer to carry out printing, software is required which understands a printing instruction from a printing application installed in the host computer and sends a print control command and print data based on the printing instruction to the printer, to thereby control the printer. This software for control of the printer is the aforementioned printer driver.

As typified by the printer driver, devices or apparatuses connected to a host computer are controlled by control commands received from applications therefor via respective device drivers. Each device driver is not dedicated to a specific host application activated on an operating system, and therefore insofar as a device is connected to the host computer, the device driver therefor is resident in the host computer, as a kind of resident program occupying a specific memory area of the host computer.

Recent OSs, typified by Windows (registered trademark), have a plug-and-play function of automatically installing a proper device driver suitable for a device when the device is connected to a host computer. In a plug-and-play process executed when a device is connected to the host computer for the first time, if no optimal device driver is found among standard device drivers provided by the OS, it is necessary to install a device driver in the OS, which is provided at the time of purchase of the device in a state stored in a medium, such as a floppy disk or a CD-ROM. This operation of installing a device driver in an OS will be referred to hereinafter as a device driver installation operation.

In the following, a description will be given of a process for installing a device driver in a plug-and-play compatible OS.

Figure 2A:
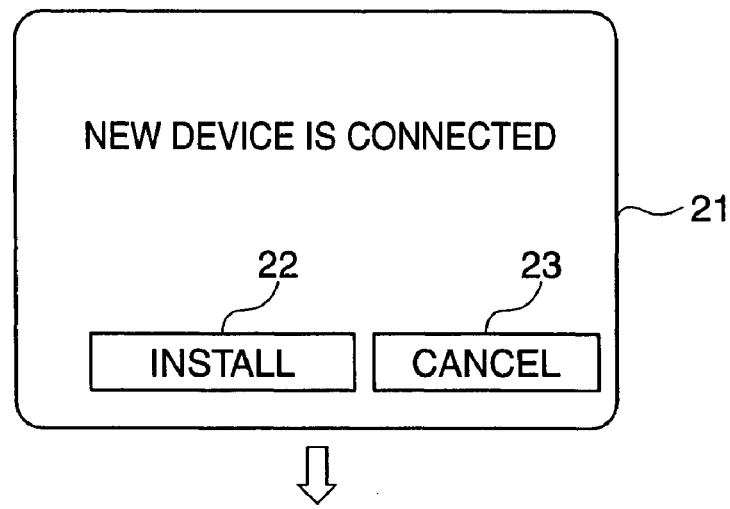
FIG. 2 is a view showing screens generally displayed in installing a printer driver using the USB interface.
Figure 2B:
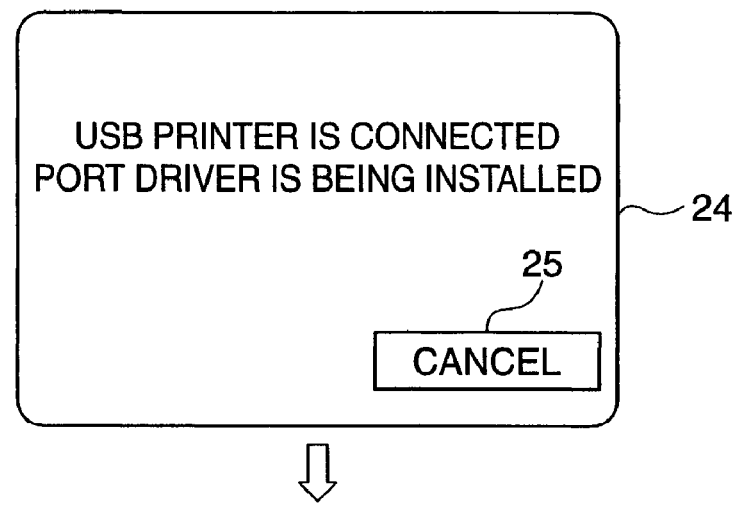
Figure 2C:
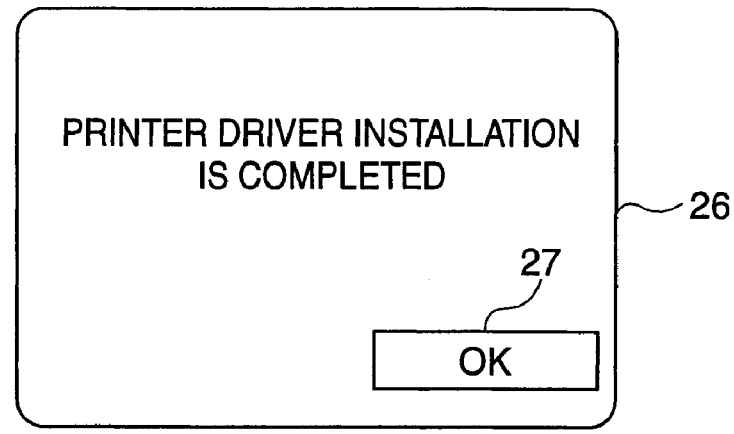
Figure 3:
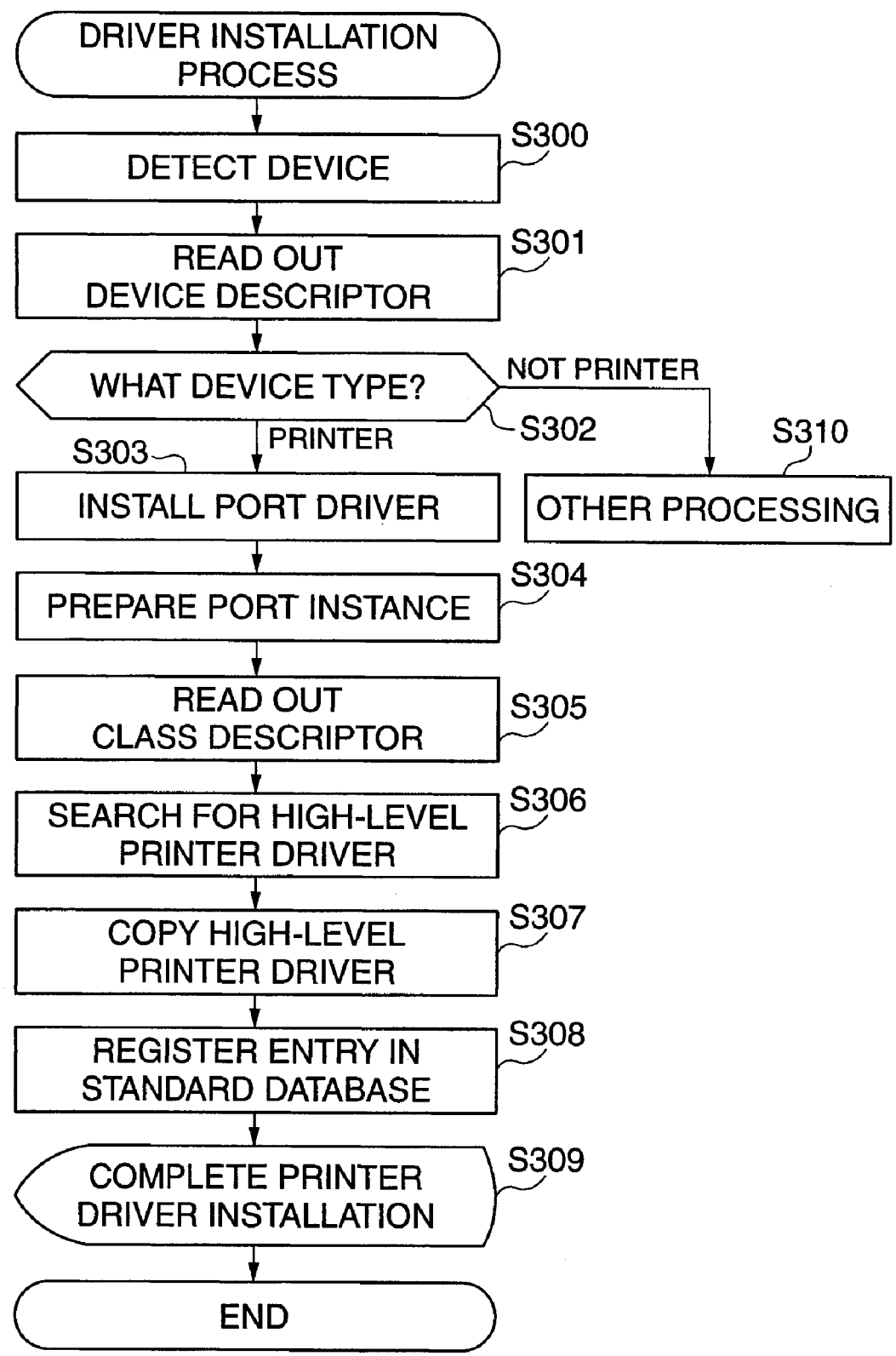
FIG. 3 is a flowchart showing a general procedure of installation of a printer driver using the USB interface.

One of the typical plug-and-play wire interfaces is the USB interface. The description will be given by taking, as an example, printer driver installation using the USB interface. FIG. 2 shows message screens displayed on a host computer, and FIG. 3 is a flowchart showing the sequence of the installation operation. The message screens and the sequence in FIGS. 2 and 3 illustrate only a case where the plug-and-play process was normally carried out. Of course, when the plug-and-play process has failed, an error sequence different from the above is carried out.

First, the user connects the printer to the host computer by using the USB interface as a plug-and-play interface. An OS operating on the host computer detects that the device has been connected to the host computer via the USB interface (step S300 in FIG. 3). At this time, the OS displays a screen 21 in FIG. 2. If the user wants to install a printer driver, he/she depresses a button 22, whereas if the user does not, he/she depresses a button 23.

Then, the OS reads from the printer a device descriptor as basic information of the USB device (i.e. printer) by a predetermined method defined by the USB standard (step S301). The device descriptor contains basic function information of the device, including device class information indicative of the type of the device. The OS reads and analyzes the device descriptor to thereby recognize that the device connected thereto is one belonging to the printer class, i.e. a printer. If the device connected to the OS is a printer, the process proceeds to a step S303, whereas if the device connected to the OS is a device other than a printer, the process proceeds to a step S310. In the step S310, other processes associated with the device are carried out.

In general, a device driver for a printer is roughly comprised of two drivers at respective different levels. One of them is a port driver as a lower-level driver that controls a protocol for use in data communication with the printer on each interface to which the printer is connected, and the other is a high-level printer driver that operates at a higher level than the port driver and converts actual print application data to record data or a printer language suitable for the specific type of the printer. Further, the high-level printer driver acquires status information indicative of the operating status of the printer from the printer, and passes the status information to a printer status display application.

When having recognized that the device connected to the OS is a printer, the OS installs a suitable port driver to enable the port driver (step S303). At this time, the OS displays a screen 24 in FIG. 2. If the user wants to cancel installation of the port driver, a button 25 is depressed. Further, through control of the port driver, a port instance as a logical connection for one-to-one data communication between a specific device detected on an interface and the host computer is provided. When the detected device is a USB printer, a port driver for USB printing is installed, whereafter a port instance is generated as a logical communication path for communication between the printer and the host computer (step S304).

When the port driver is loaded and enabled after initialization, the OS acquires a class descriptor as detailed information of the printer connected thereto (step S305). In the case of the USB printer, a command (GET_CAPABILITIES) for reading a device ID defined by a USB printer class standard is issued to the printer device via the port driver, whereby the class descriptor is acquired. The device ID sent back in response to the command contains information of a printer manufacturer, a model name, information of supported printer languages, and other information specific to the printer model.

The OS acquires detailed information of the USB printer device connected thereto, and searches for an optimal high-level printer driver based on the detailed information (step S306). If the optimal high-level printer driver is present within a standard retrieval range of the OS, the high-level printer driver found within the standard retrieval range is installed. On the other hand, if no suitable high-level printer driver is present within the standard retrieval range of the OS, a message or the like inquiring of the user where the driver is stored is displayed. In this case, the user designates a medium, such as a floppy (registered trademark) disk or a CD-ROM, provided at the time of purchase of the device in a manner bundled with the device, or a device driver downloaded from a manufacturer's file server via the Internet, whereby the suitable high-level printer driver is installed in the OS (step S307). During this installation, the high-level printer driver is copied in a predetermined area (directory) on the host computer, according to a predetermined procedure.

Figure 4:
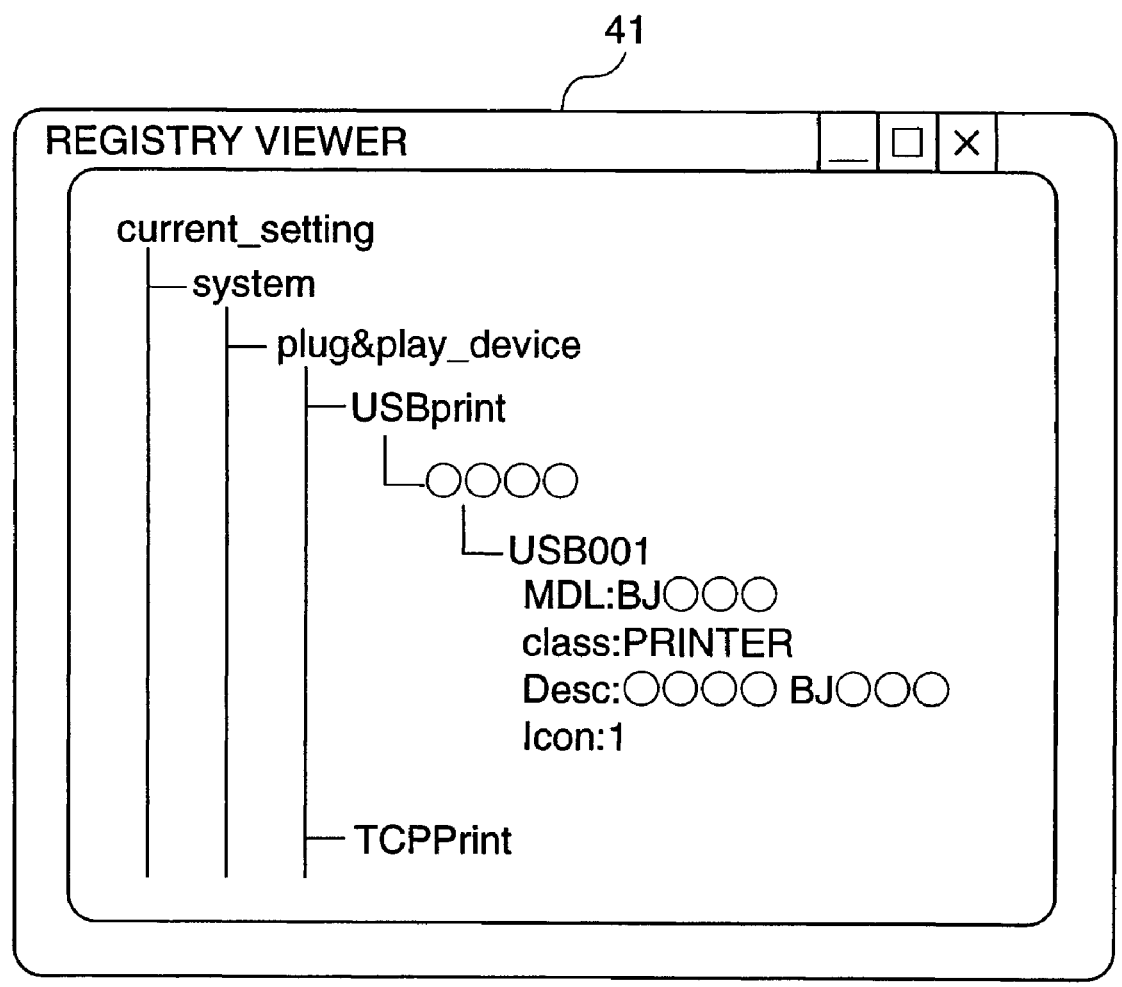
FIG. 4 is a view showing an example of a standard database in an OS.

Then, an entry associated with the device being currently installed is added to a database provided in the OS as a standard component (step S308). This database stores device-specific control setting parameters, information of driver/device configuration, port instance information associated with device instances, information of settings by the user, and so forth. In OSs, such as Windows 2000 (registered trademark) and Windows XP (registered trademark), this standard database is generally referred to as "the registry", and therefore will also be referred to as such in the following description. FIG. 4 shows an example of the registry displayed in a manner recognizable to a user.

An entry is prepared for each device with which the OS communicates via a port instance generated by the OS itself. More specifically, an entry is provided for each logical connection between the OS and a device, and port instance information corresponding to the logical connection is stored in the entry whereby the port instance and the entry are associated with each other. For example, when a printer equipped with a plurality of connection interfaces is connected to a host computer via the respective interfaces, port instances are prepared on an interface-by-interface basis. Although a high-level printer driver used in the same printer is common to a plurality of interfaces, an entry associated with the high-level printer driver is prepared in the registry on an interface-by-interface basis or on a logical connection-by-logical connection basis.

When preparation for starting the printer driver is completed, as described above, a message indicative of completion of the installation of the printer driver is displayed on a screen 26 shown in FIG. 2 (step S309).

Figure 5:
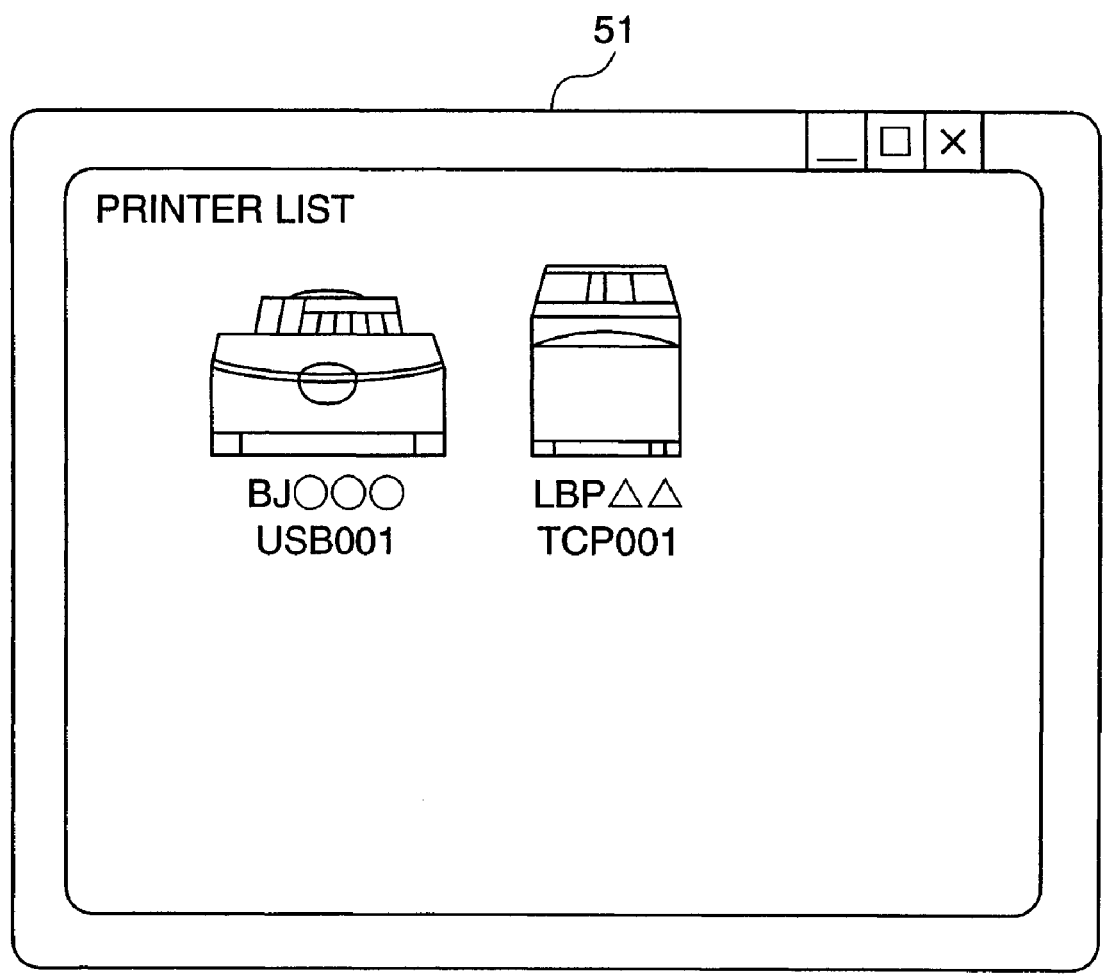
FIG. 5 is a view showing an example of a printer list screen in the OS.
Figure 6A:
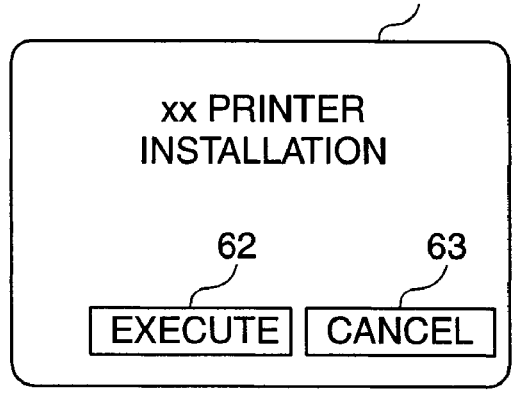
FIG. 6 is a view showing examples of screens displayed during execution of a printer driver installation process using the USB interface.
Figure 6B:
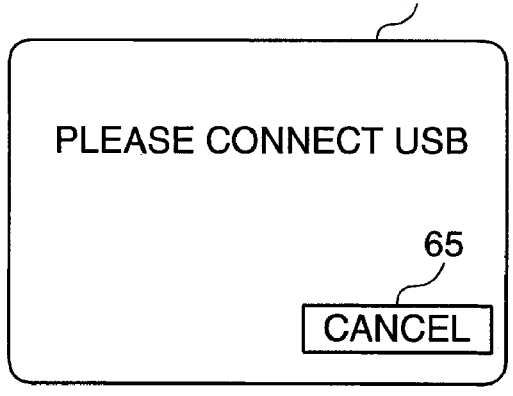
Figure 6C:
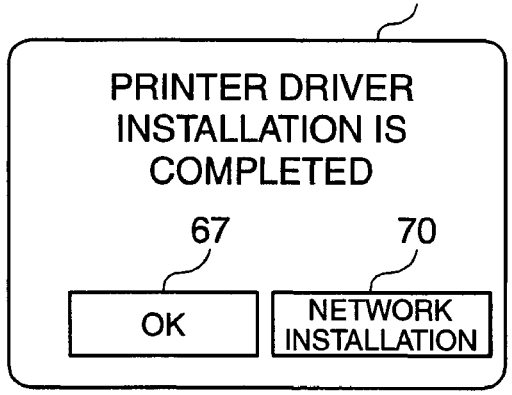
Figure 6D:
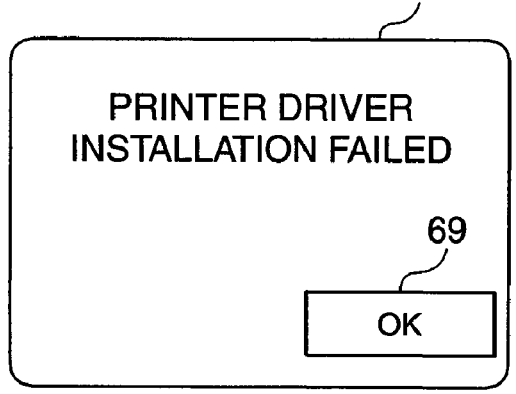

On a printer list screen of an OS equipped with a GUI, a port instance associated with a printer is visually represented by a printer icon. FIG. 5 shows an example of this screen. More specifically, when a plurality of port instances are prepared in association with a specific printer, for communication between the printer and a host computer via a plurality of interfaces, printer icons associated with the respective port instances are displayed. Information of the association between a printer icon and the associated port instance is also described in an entry prepared on a port instance-by-port instance basis, so that information of which port instance is visually represented by which printer icon is also managed.

The above description illustrates the device driver installation process in the plug-and-play compatible OS by taking the USB printer as an example. Of course, in an OS of a different type, a device driver can be installed in a different manner, but in general, installation of a plug-and-play device is carried out in substantially the same sequence as described above.

FIG. 6 shows examples of screens displayed in execution of a printer driver installation process using the USB interface. These screens are displayed on the display of the PC 11 during installation of a printer driver on the PC 11 for enabling the printer 12 in FIG. 1 to perform printing.

First, a screen 61 is displayed as an initial screen. The screen 61 is a start screen for the printer driver installation process, which is displayed when the user has activated a software program for installation. On the screen 61, there are provided selection icons 62 and 63 for selection between "Execute" and "Cancel". The selection icons 62 and 63 can be selected with a mouse or the like. When the "Execute" icon 62 is selected, the installation is started, and the next screen 64 is displayed. When the "Cancel" icon 63 is selected, the process is canceled without executing installation of the printer driver.

On the screen 64, a message instructing the user to connect between the PC 11 and the USB interface of the printer 12 is displayed, and the user follows the instruction and connects the USB cable 15 to the USB interface of the printer 12. If the power of the printer 12 is off, the user turns on the printer 12. Also on the screen 64, the installation can be canceled by selecting a "Cancel" icon 65.

When the user connects the USB cable 15 to the printer 12 and turns on the printer 12, the installation of the printer driver and internal setting of the printer 12 are completed by the plug-and-play function. The installation of the printer driver by the plug-and-play function is carried out, according to the procedure described with reference to FIG. 3.

When the printer driver is successfully installed, a screen 66 is displayed so as to notify the user of completion of the installation, and the software program is terminated by the user selecting an "OK" icon 67. When the installation of the printer driver has failed for some reason or other, a screen 68 is displayed so as to notify the user of the failure of the installation. Similarly to the screen 68, the software program is terminated by the user selecting an "OK" icon 69.

As described above, the printer driver installation using the USB interface is completed by operation performed according to instructions displayed in the sequence of the screens 61→64→66, which enables transmission of print data via the USB interface.

Figure 7:
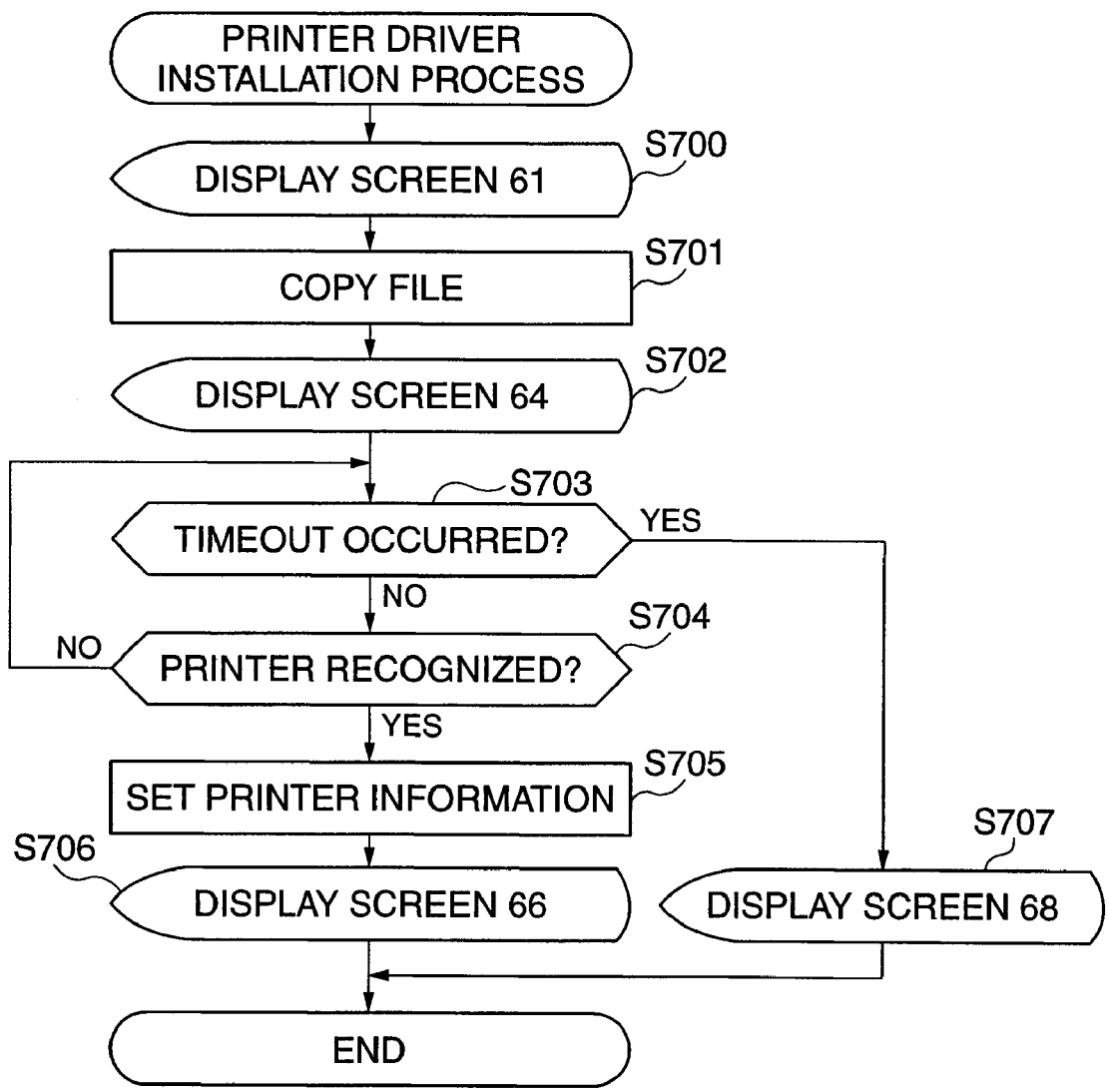
FIG. 7 is a flowchart showing the printer driver installation process.

FIG. 7 is a flowchart of the printer driver installation process of the present embodiment, which is executed by the PC 11 while displaying the screens shown in FIG. 6.

First, the screen 61 shown in FIG. 6 is displayed (step S700). If the "Execute" icon 62 is selected on the screen 61, the process proceeds to a step S701, wherein a printer driver execution file is copied in a system folder of the OS. More specifically, the OS sets in advance a predetermined area within the system folder for storing the printer driver execution file and an information file, and the printer driver execution file is copied in the predetermined area. As described hereinbefore with reference to FIG. 3, the OS locates a suitable printer driver in a storage area indicated by a predetermined information file. The file related to the printer driver is copied in the predetermined area so that the operation of locating the printer driver can be properly performed.

Then, the screen 64 shown in FIG. 6 is displayed (step S702). Then, it is checked whether a predetermined time period has elapsed after the screen 64 was displayed (step S703). If the predetermined time period has not elapsed, i.e. if a timeout has not occurred, it is checked whether a printer has been identified (step S704). This step is executed in order to check whether or not the printer 12 has been properly detected by the plug-and-play function, and completion of installation of the printer driver is regarded as completion of identification of the printer. Detailed description thereof was made hereinbefore with reference to FIG. 3.

If it is determined in the step S703 that a timeout has occurred, a message indicative of the failure of the installation is displayed on the screen 68 (step S707). If the printer 12 has been identified in the step S704, the process proceeds to a step S705, wherein setting of printer information related to the installed printer driver is performed. Then, in a step S706, the screen 66 is displayed to indicate that the installation has been normally completed. In the step S706, the screen 66 is displayed in place of the screen 26 in FIG. 2. When the "OK" icon 67 is selected on the screen 66, the printer driver installation process using the USB is completed.

Since the printer 12 of the present embodiment has both the USB interface and the wireless LAN interface, an icon 70 for selecting "Network installation" is displayed on the screen 66, assuming that the setup of a wireless LAN connection (i.e. wireless network installation) will be executed immediately after completion of the printer driver installation.

In the following, a description will be given of a wireless network installation process in the case where the wireless network includes a plurality of access points and printers.

FIGS. 8A to 8C and FIGS. 9D and 9E are views showing examples of screens displayed in execution of the wireless network installation process using the USB, according to the present embodiment. These screens are displayed on the display of the PC 11, for carrying out the setup of the wireless LAN connection immediately after completion of the printer driver installation described with reference to FIGS. 6 and 7.

Figure 8B:
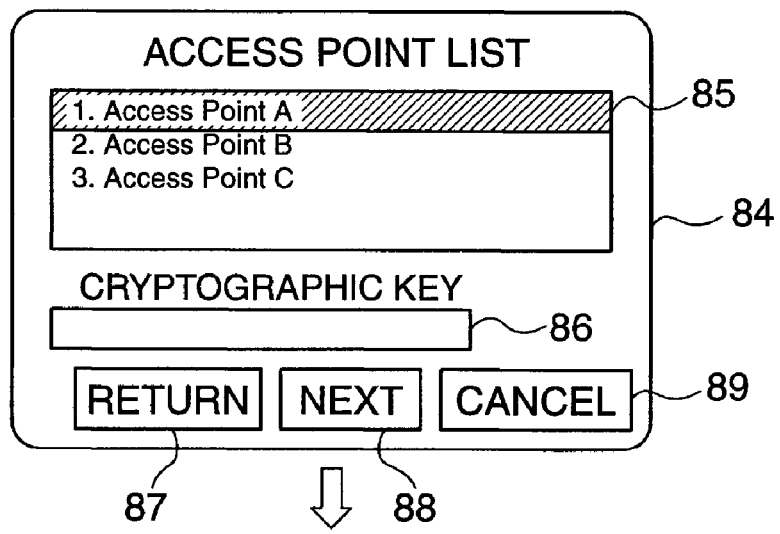
Figure 8C:
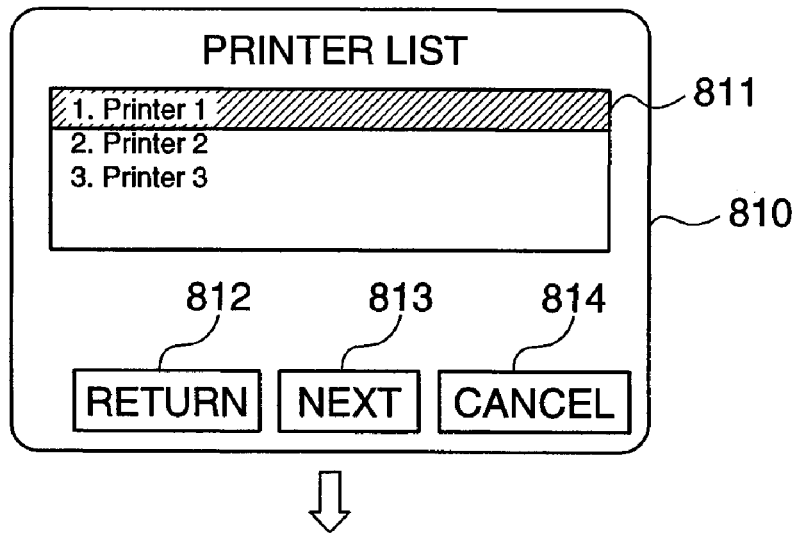

When the "OK" icon 67 is selected on the screen 66 in FIG. 8A, the setup of the wireless LAN connection is not executed, whereas when the "Network installation" icon 70 is selected, the wireless network installation process is started, and first, an operating screen 84 (FIG. 8B) is displayed for selecting an access point for connection to the same.

On the screen 84, a list of access points to which the printer 12 can be connected via the wireless LAN card 14 mounted in the printer 12 is displayed based on access point information sent from the printer 12 via the USB cable 15 in response to an access point search command sent from the PC 11 to the printer 12 via the USB cable 15. When having received the access point search command from the PC 11 via the USB cable 15, the printer 12 searches for the access points using the wireless LAN card 14.

In a display area 85 on the screen 84 is displayed a list of access points detected by the printer 12 through the access point search. The present example shows that three access points A, B, and C have been detected by the printer 12. In the display area 85, access points operating within the reach of radio waves are all displayed, and therefore the access points displayed there are not limited to ones which the user uses. Therefore, by shifting a highlighted line within the display area 85, it is possible to select a desired access point from a plurality of access points.

When a selected access point is an encrypted one, a decryption key for decryption or crypt analysis can be entered in an input area 86 to thereby deal with the encrypted access point. In general, a wireless LAN employs an encryption technique for preventing tapping and leakage of data. One of the typical encryption techniques is WEP (Wired Equivalent Privacy). WEP is an algorithm using identical cryptographic information, called a key, for both encryption and decryption, and by setting this key, data is concealed from the other devices. When the wireless LAN is used in an encrypted environment, it is necessary to set the same encryption key to the printer 12 as well.

When a "Return" icon 87 is selected on the screen 84, the screen 84 is switched to the previous screen 66, and when a "Next" icon 88 is selected, the screen 84 is switched to the next screen in a state where an access point selected in the area 85 is designated. When a "Cancel" icon 89 is selected, the installation is canceled.

Thus, on the screen 84, the user can select and designate an access point currently used by him/her, which makes it possible to prevent erroneous connection to another access point in transmitting print data to the printer 12. When the user selects an access point on the screen 84, the access point to be used is set to the printer 12, which enables the printer 12 to be recognized via the access point 13. The PC 11 searches for a printer via the wireless LAN to check whether or not the printer 12 has been properly connected.

On the next screen 810 (FIG. 8C) is displayed a list of printers detected via the access point. The acquisition and display of this list of printers is performed by the PC 11 sending a printer search command via the access point 13 through the wireless LAN interface, and printers having received the command responding back to the PC 11. More specifically, the search command is transmitted to all devices and apparatuses on the network by broadcast, and devices and apparatuses (specific printers and printer adapters in the present case) having received the search command and capable of understanding the same send predetermined information in response to the command to the host computer that transmitted the command. This information contains the name, ID, and address of each printer, and a printer to be connected to the host computer is identified based on the information.

On the screen 810, the list of the detected printers is displayed in a display area 811. In the illustrated example, three printers have been detected. Similarly to the case of selecting an access point, a printer highlighted in the area 811 is selected. When a "Return" icon 812 is selected on the screen

810, the screen is switched back to the previous screen 84, while when a "Cancel" icon 814 is selected, the installation is canceled.

Further, when a "Next" icon 813 is selected on the screen 810, the printer selected in the display area 811 is determined as a connection partner, and then a screen 815 (FIG. 9D) for use in entering a port name is displayed. An input area 816 on the screen 815 is for entering a desired port name. A port name is used to identify each printer when a plurality of printers connected to a single PC have the same function (e.g. wireless LAN), and an initial value to be set by default is WLAN01. "WLAN" is an identifier indicative of a printer on the wireless LAN, and "01" represents a last number (also "first" in the present case) registered in the system, which is added to the identifier as a serial number, so as to enable printers having the same function to be distinguishably handled. The printer driver identifies a printer by the port name.

When a "Return" icon 817 is selected on the screen 815, the screen is switched back to the previous screen 810, while when a "Cancel" icon 819 is selected, the installation is canceled. Further, when a "Next" icon 818 is selected, the name entered in the input area 816 is determined as a port name, and then, a screen 820 (FIG. 9E) is displayed to indicate that the network installation has been completed.

Figure 10:
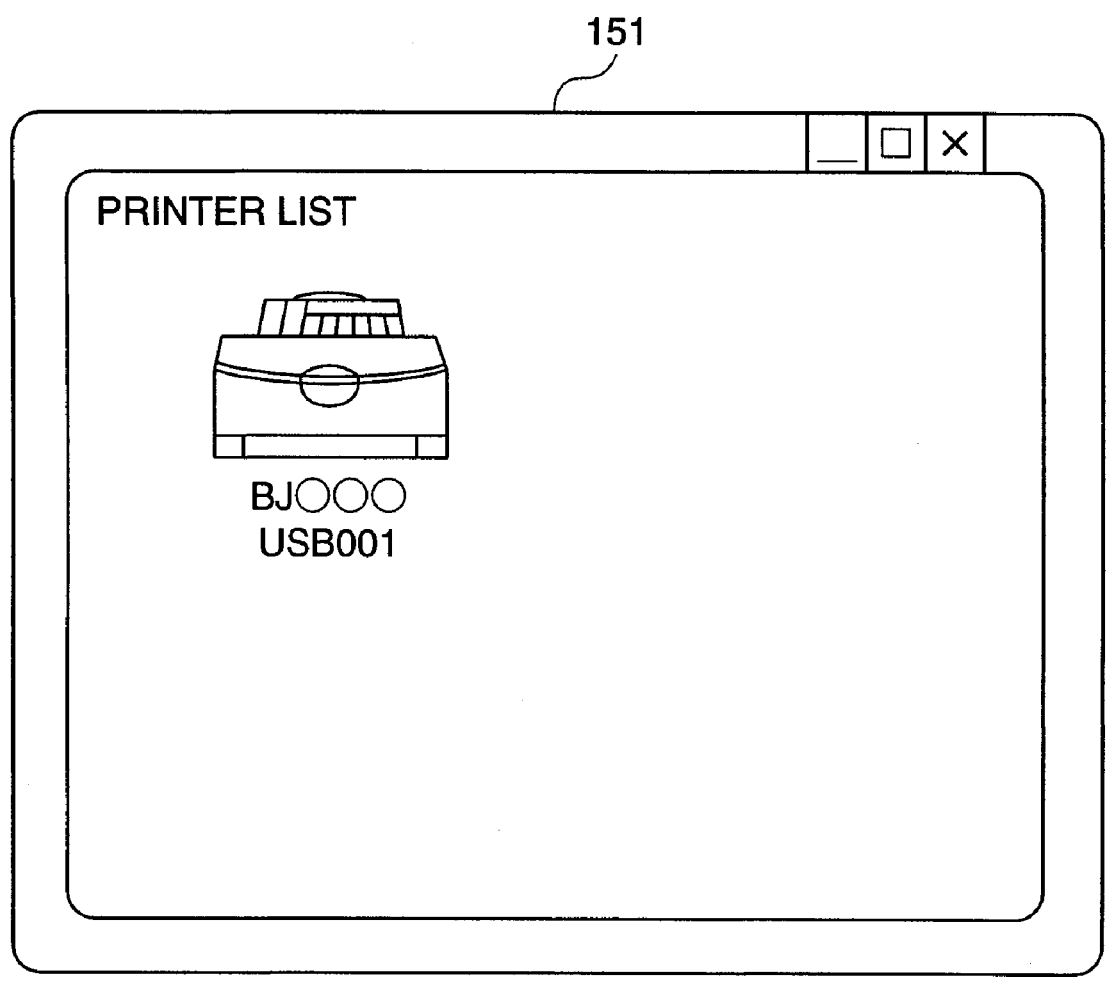
FIG. 10 is a view showing a printer list screen displayed when a user selects setup of a wireless LAN port alone.
Figure 11:
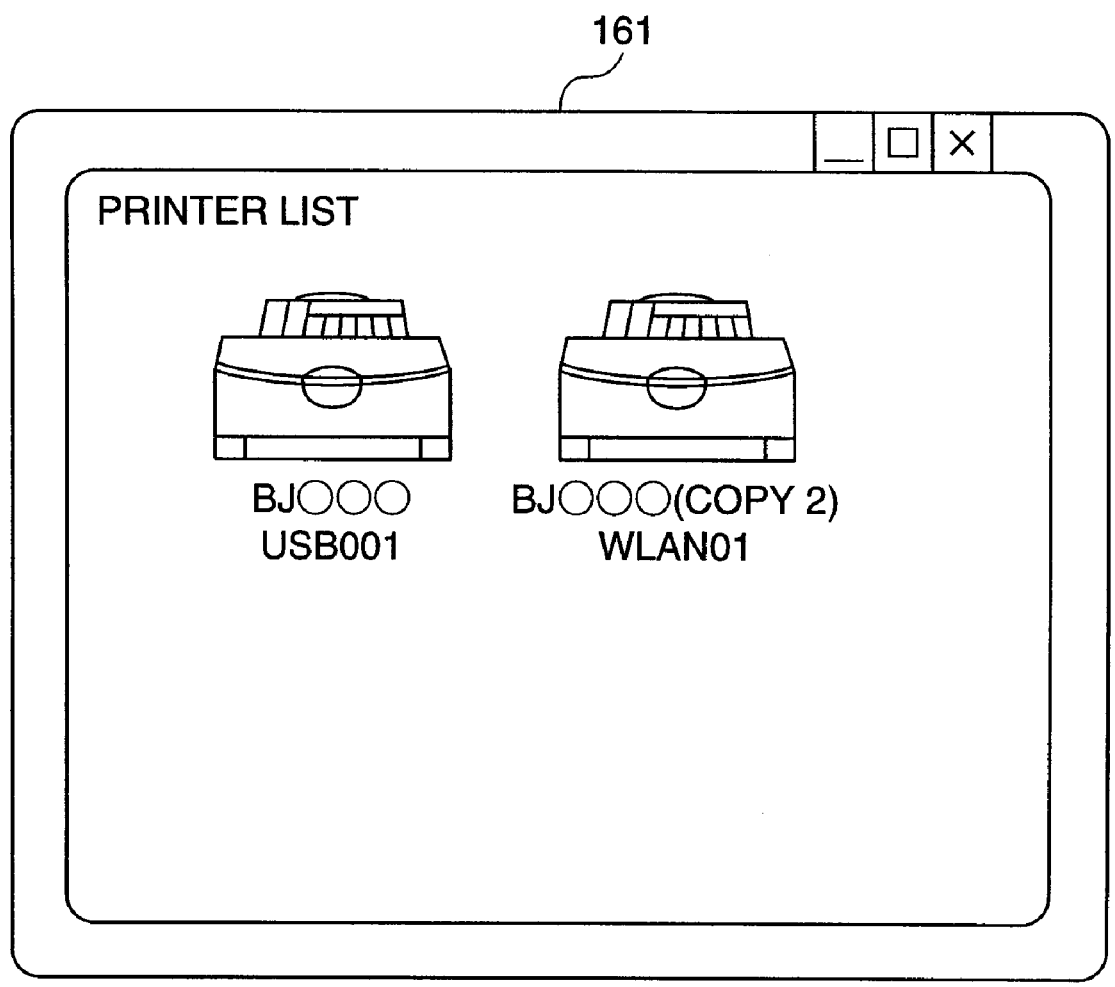
FIG. 11 is a view showing a printer list screen displayed when the user selects setup of not only the wireless LAN port but also a USB port.

On the screen 820, there are displayed two radio buttons 821 and 822. When only an icon for a wireless LAN printer is to be prepared, the user selects the radio button 821, while when icons for both a wireless LAN printer and a USB printer are to be prepared, the user selects the radio button 822. When the user selects an "OK" icon 823 after having selected the radio button 821, a printer icon shown in FIG. 10 is prepared, for example. On the other hand, when the user selects the "OK" icon 823 after having selected the radio button 822, printer icons shown in FIG. 11 are prepared, for example. The user utilizes the printer icons to check registered printers, discriminate between them, or identify a currently available printer. One of these icons is selected for printing carried out in response to a print instruction from the print application. For example, when a "BJOOOUSB001" icon is selected on the screen in FIG. 11, print data is transmitted via the USB cable 15. On the other hand, when a "BJOOO (copy 2) WLAN01" icon is selected, print data is transmitted via the wireless LAN.

Generation of a printer icon immediately after completion of the wireless network installation can be achieved by a method in which a printer icon representative of a USB port instance is deleted, and then a printer icon corresponding to a generated wireless LAN port instance is newly prepared, a method in which settings of a printer icon representative of a USB port instance are changed to thereby assign a wireless LAN port instance thereto, or some other methods. In any case, information of the prepared printer icon is written in the entry provided in the registry of the OS in association with the wireless LAN port instance, as described hereinbefore with reference to FIG. 3, and icon information in the entry related to the USB port instance is deleted, or information indicative of disuse thereof is written in the entry. Further, depending on the installation procedure, there is a case where the entry related to the USB port instance is deleted, or the USB port instance itself contained therein is deleted.

When the user selects preparation of both the wireless LAN port instance and the USB-cable port instance, the printer icon representative of the USB port instance already generated in the setup process is preserved without being deleted or changed. In this state, a wireless LAN port instance and a printer icon representative of the same are newly prepared in the printer icon generation process executed immediately after completion of the wireless network installation (refer to the screen in FIG. 11). Also in this case, as described with reference to FIG. 3, information of the newly prepared printer icon is written in the entry provided in the registry of the OS in association with the wireless LAN port instance.

Thus, according to the method described above, when only the setup of the wireless LAN port is selected in accordance with selection of the radio button 821 by the user, only a printer icon representative of a wireless LAN port instance is prepared, while when the setup of both the wireless LAN port and the USB port is selected in accordance with selection of the radio button 822 by the user, two printer icons representative of the wireless LAN port instance and the USB port instance are prepared.

In the following, a description will be given of a wireless network installation process executed in the case where only a single access point and a single printer are detected.

Figure 12A:
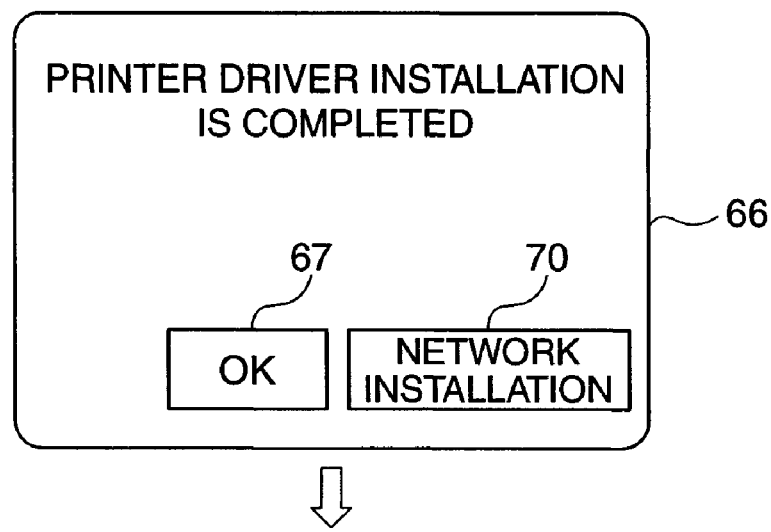
FIG. 12 is a view showing a second sequence of screens displayed during execution of another wireless network installation process using the USB interface.
Figure 12B:
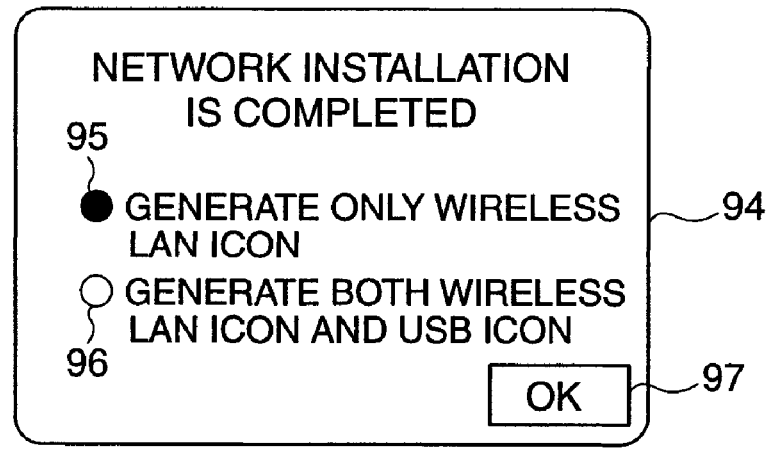

FIG. 12 shows a second sequence of screens displayed during execution of another wireless network installation process using the USB interface, according to the present embodiment. These screens are displayed on the display of the PC 11 in place of the screens shown in FIGS. 8A to 8C, 9E and 9D, when only a single access point and a single printer are detected through the access point search and the printer search in the wireless network installation process using the USB interface.

Figure 9D:
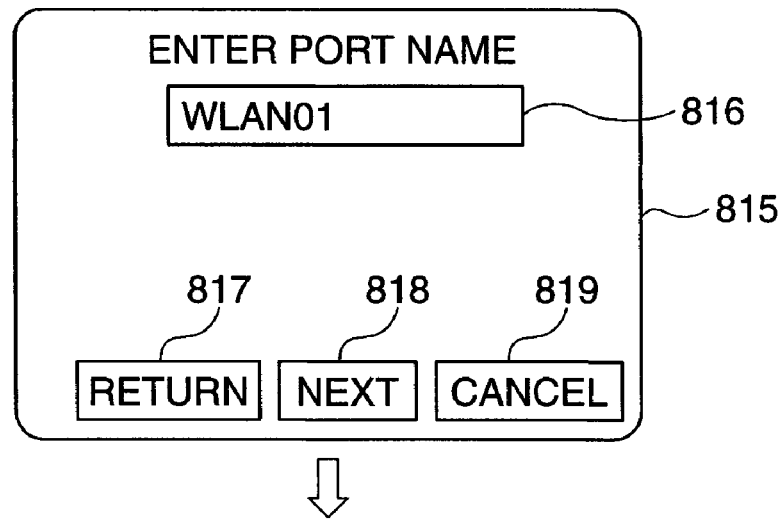
FIGS. 9D and 9E are views showing screens as a continued part of the sequence of FIGS. 8A to 8C.
Figure 9E:
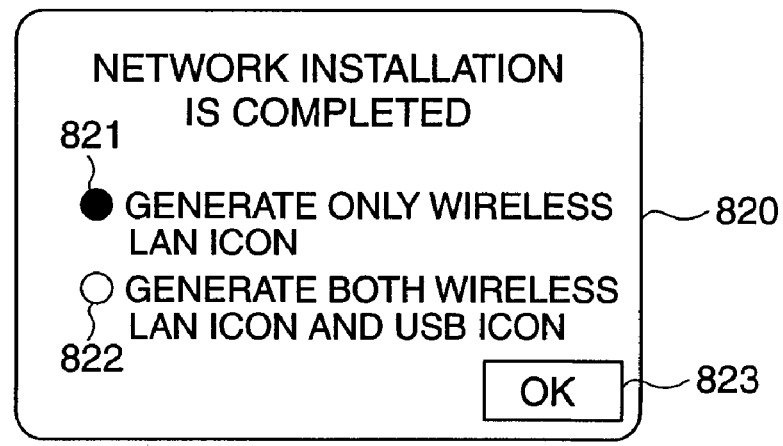

In the present sequence of screens, the screens 84, 810 and 815 are omitted from the screens described with reference to FIGS. 8A to 8C, 9D and 9E, and only the screen 66 and a screen 94 corresponding to the screen 820 in FIG. 9E are displayed. In the environment where the single access point and the single printer are present and in the case where a port name may be automatically generated, the user gives only two instructions, i.e. selecting the "Network installation" icon 70 on the screen 66 and an "OK" icon 97 on the completion screen 94, whereby the setup of the wireless network connection is completed.

Figure 13:
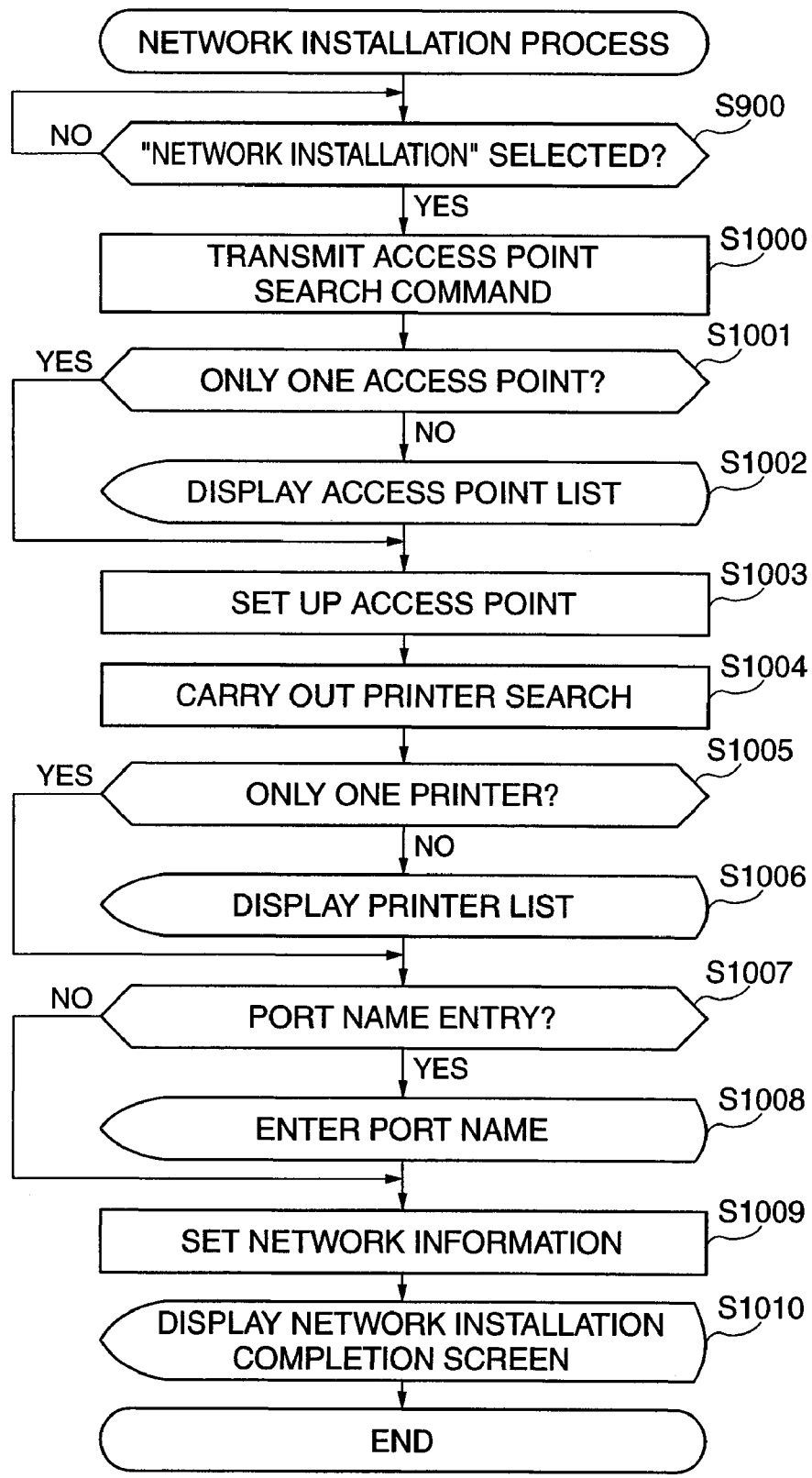
FIG. 13 is a flowchart showing the other wireless network installation process.

FIG. 13 is a flowchart showing another process executed by the PC 11, i.e. the other wireless network installation process according to the present embodiment, in which are displayed the screens shown in FIGS. 8A to 8C, 9D, 9E and 12.

First, it is determined in a step S900 whether or not the "Network installation" icon 70 has been selected on the screen in FIG. 8A. If the icon 70 has been selected, the process proceeds to a step S1000, wherein the access point search command is transmitted to the printer 12 via the USB cable 15. The printer 12 searches for an access point, and sends information of the detected access point to the PC 11 via the USB cable 15.

As USB commands for wireless network installation, which the PC 11 sends to the printer 12 via the USB cable 15, there are provided three commands, i.e. the access point search command, an information acquisition command, and an information setting command.

When the access point search command is sent to the printer 12, the printer 12 configures a wireless LAN module thereof, such as the wireless LAN card 14, so as to use the wireless LAN module for access point search. The wireless LAN module of the printer 12 configured for access point search transmits a signal for access point search. An access point having received this signal sends access point information (an ID, radio wave conditions, an address, a channel, etc.) of the access point itself to the wireless LAN module that has transmitted the search signal. The wireless LAN module of the printer 12 receives the information sent from the access point, and the printer 12 sends the received information to the PC 11 using the USB interface. At this time, the printer sends back information of all detected access points to the PC 11.

In the next step S1001, it is checked, based on the access point information sent from the printer 12, how many access points have been found. If more than one access point have been found, the process proceeds to a step S1002, wherein the access point list screen 84 is displayed so as to allow the user to select a desired access point. If only one access point has been found, the process skips over the step S1002 to a step S1003.

In the step S1003, the setup of an access point for wireless LAN connection is carried out. This setup is performed by sending the information setting command for designating the access point which has been selected by the user based on the information of the access points detected in the step S1000 or the only one detected access point, to the printer 12 via the USB cable 15. When an address, an encryption key, and other pieces of information of the access point, which are necessary for utilization of the access point, are set by the information setting command, the printer 12 can be connected to the specific access point.

In the next step S1004, printer search is carried out using a network command. As network commands, there are provided two network installation commands, i.e. a broadcast printer search command and an addressed printer search command. In the broadcast printer search command, no recipient is designated, whereas in the addressed printer search command, a specific recipient is designated.

In the illustrated example, the PC 11 transmits the broadcast printer search command. This command is transmitted onto the wireless LAN, and a printer having received the command through the wireless LAN sends printer information (an ID, a printer name, an address, a model name, etc.) to the PC 11 that has transmitted the command, via the wireless LAN. Thus, connection between the PC 11 and the printer can be confirmed via the wireless LAN. Since this command is transmitted by broadcast, printers capable of understanding the command can all respond to the PC that has transmitted the command. Therefore, the PC 11 needs to select a printer model to be installed, based on information sent from the printers.

The PC 11 checks, based on the information sent from the printers, whether only one printer has been found connectible (step S1005). If more than one printer have been found connectible, the process proceeds to a step S1006, wherein a printer list is displayed on the screen 810 so as to allow the user to select a desired printer. If only one printer has been found connectible, the process skips over the step S1006 to a step S1007.

In the step S1007, whether or not it is necessary to display a port name is checked. If it is necessary to display a port name, the process proceeds to a step S1008, wherein the screen 815 is displayed for port name entry so as to allow the user to enter a port name. If it is unnecessary to enter a port name, the process skips over the step S1008 to a step S1009. Whether to allow the user to enter a port name may be determined depending on the necessity, and therefore the step of entering a port name can be omitted when it is required to achieve installation with a reduced number of simple screens.

In the step S1009, the PC 11 performs the setup of network information and registration of a wireless LAN port instance within the PC 11 itself, whereby the PC 11 becomes capable of transmitting print data to the printer 12 via the wireless LAN interface. Network information contains the address and name of a printer, which is necessary for printing. In the next step S1010, the network installation completion screen shown in FIG. 9E is displayed.

USB commands sent to printers via the USB cable 15 include not only the commands for installation, but also a command for sending print data, and commands for various kinds of configurations of printers, but only the installation commands directly related to the present invention are referred to in the present embodiment. One of the installation commands is the access point search command described with reference to the step S1000 in FIG. 13. A second one is the information acquisition command which is used for acquiring information concerning a wireless LAN set to a printer, from the printer. A third one is the information setting command. This is a command for setting information of the wireless LAN (e.g. the address of an access point, a mode, a channel, etc.), and this command is used for designating an access point in the step S1003 in FIG. 13.

In the present embodiment, as described hereinbefore, as network commands used for installation, there are provided the two network installation commands, i.e. the broadcast printer search command that all printers can receive, and the addressed printer search command that a specific printer receives. Network commands include not only the above-mentioned commands, but also a command for sending print data, and commands for various kinds of configurations of printers, but only the installation commands directly related to the present invention are referred to in the present embodiment.

By using the installation commands, it is possible to determine whether a printer on the network has been properly detected and whether it is properly set up for use, i.e. the connection between the PC 11 and the printer via the wireless LAN can be confirmed. These commands are forwarded and returned using a general network protocol, such as TCP/IP or UDP.

In the following, a description will be given of a network installation process executed by a second PC.

Figure 14A:
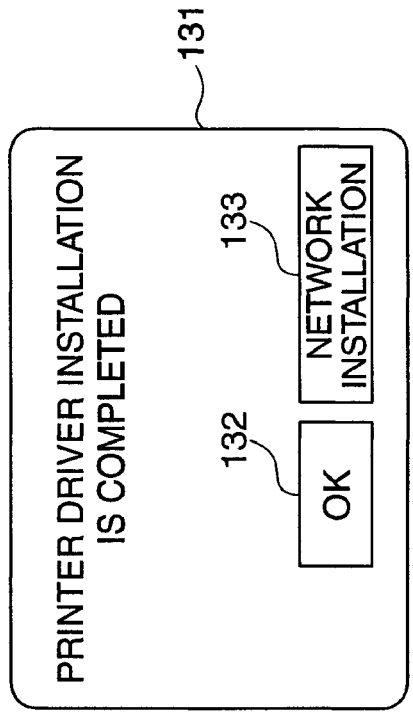
FIG. 14 is a view showing examples of screens displayed during execution of a wireless network installation process on a second PC.
Figure 14C:
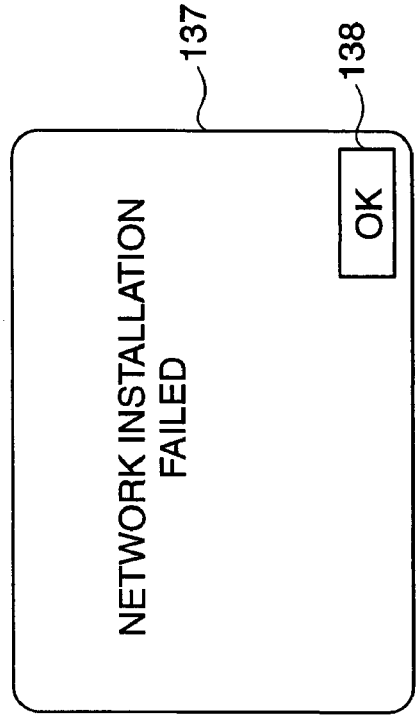
Figure 14B:
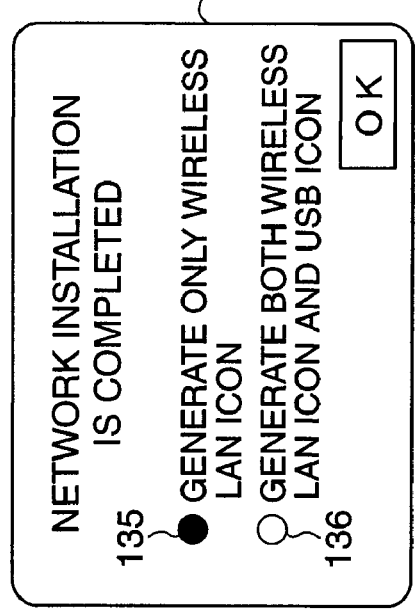

FIG. 14 shows examples of screens displayed during the wireless network installation process executed by the second PC.

To carry out a printer driver installation process and a wireless network installation process by the second PC (in which neither a printer driver nor a wireless LAN device has been installed) after the setup of the printer for wireless LAN connection has been completed by execution of the printer driver installation process and the wireless network installation process in the first PC as described with reference to FIGS. 6 to 13, only the setup on the PC side is performed because the setup of the printer for wireless LAN connection has already been completed.

The printer driver installation process in the second PC is identical to the installation process described with reference to FIGS. 6 and 7, and therefore description thereof is omitted. When a screen 131 is displayed after completion of the printer driver installation process, and network installation is to be performed, a "Network installation" icon 133 is selected. Then, if the network installation is normally completed, a network installation completion screen 134 identical to the screen 94 is displayed, whereas when no connected printer is detected on the wireless LAN for some reason or other, a network installation failure screen 137 is displayed.

Figure 15:
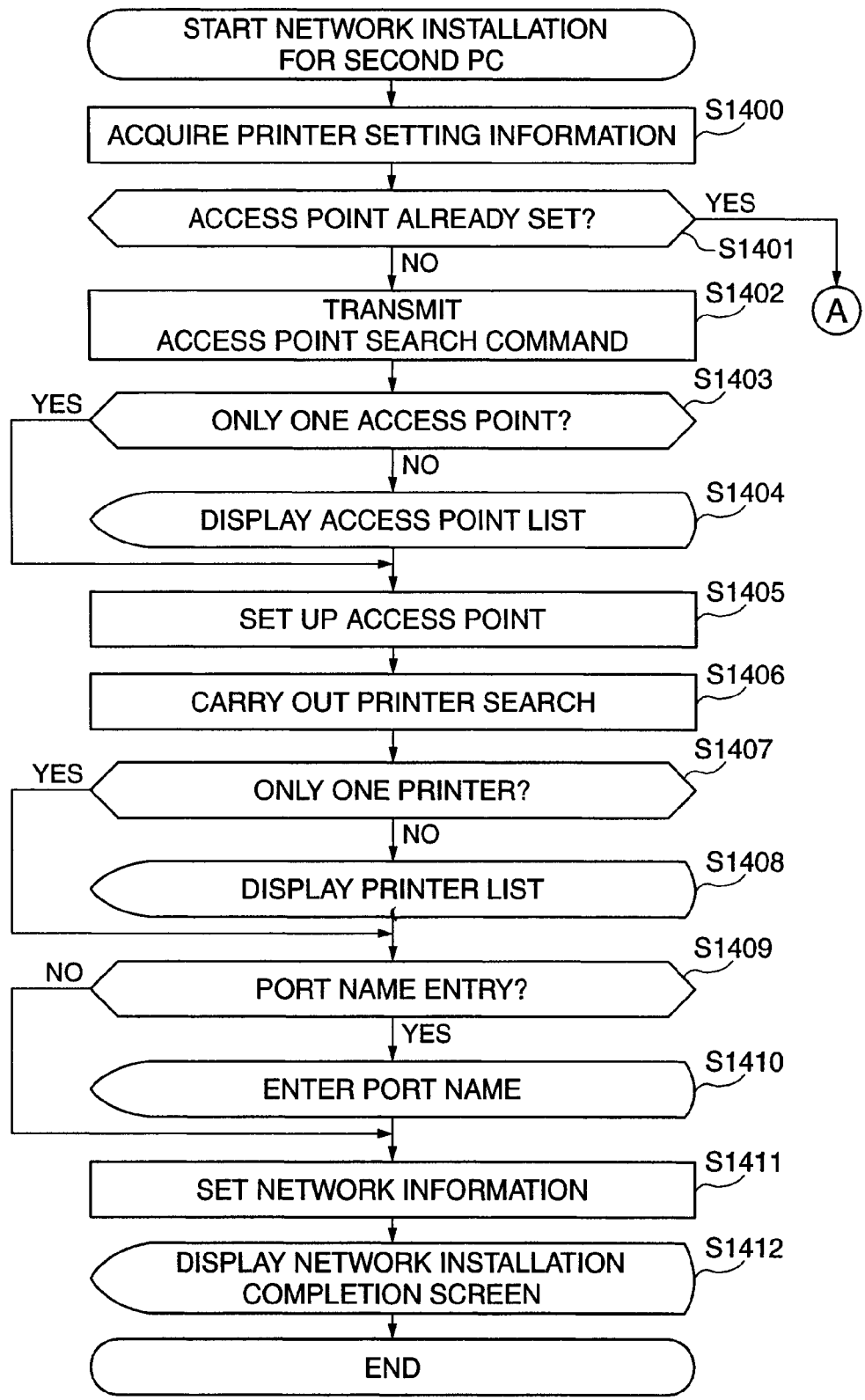
FIG. 15 is a flowchart showing the wireless network installation process in FIG. 14 which is executed by PCs.

FIGS. 15 and 16 are a flowchart showing a process executed by the PC for the wireless network installation described with reference to FIG. 14. This flowchart includes not only the setup of the wireless LAN connection and the printer to be performed by the first PC, but also the setup of the same to be performed by the second and subsequent PCs.

First, in a step S1400, setting information of the printer 12 is acquired. In this step, the information acquisition command is sent from the PC to the printer 12 via the USB cable, and the printer 12 sends information already set thereto via the USB cable. The information set to the printer 12 contains information related to the wireless LAN, and the information related to the wireless LAN contains information indicative of whether or not an access point is set.

The access point setting information is the information set in the network installation process executed on the first PC immediately after the printer driver installation (refer to the step S1003 in FIG. 13). When an access point has already been set, it is unnecessary to set an access point anew, and the information already set is used.

In a step S1401, it is checked, based on the information from the printer 12, whether or not an access point has already been set. If an access point has not been set yet, this means that the present PC is a first PC. In this case, it is necessary to start with the access point setup, and therefore it is necessary to execute the process described with reference to FIGS. 8A to 8C, 9D, 9E and 10.

Steps S1402 to S1412 are identical to the steps S1000 to S1010 in FIG. 13, and therefore detailed description thereof is omitted. In the steps S1402 to S1412, the setup of the access point of the printer 12 and the setup of the network on the PC side are performed.

If it is determined in the step S1401 that an access point has already been set, the process proceeds to a step S1413 in FIG. 16, wherein a specific printer search process is executed. The information acquired from the printer in the step S1400 contains the address and ID of the printer already set, so that an addressed printer search command based on the information is transmitted to the wireless LAN. Since the setup for communication between the second PC and the access point has already been completed, the second PC is allowed to issue commands to the wireless LAN. The addressed printer search command is a search command in which an address is specified, and therefore the command can be sent only to a printer currently connected to the PC by the USB cable.

When the command reaches the printer, the printer sends printer information back to the PC that has transmitted the command, via the wireless LAN. On the PC side, it is checked whether a response has arrived from a printer, and whether the response having arrived is valid (step S1414). In this case, the information sent from the printer via the wireless LAN and the information acquired via the USB cable are compared with each other, and if they are found identical, it is judged that a desired printer has been properly detected. Thus, the connection between the PC and the printer can be confirmed via the wireless LAN.

If no printer responds to the command from the PC for some reason or other, or if the information received via the wireless LAN and the information received via the USB cable are not identical, the process proceeds to a step S1419, wherein the screen 137 is displayed. When a printer is properly detected in the step S1414, the process proceeds to a step S1415. Steps S1415 to S1418 are identical to the steps S1409 to S1412, and therefore description thereof is omitted. Execution of the steps S1415 to S1418 completes the wireless LAN installation in the second PC, which enables printing via the wireless LAN.

The present embodiment provides the following advantageous effects:

(1) Wireless LAN network installation is performed immediately after completion of printer driver installation executed using a USB interface, utilizing the printer driver installation executed using the USB interface, which makes it possible to simplify the procedure of the wireless LAN installation.

(2) Connection to a printer via the wireless LAN is actually checked, and the installation of the printer driver is completed only when the connection via the wireless LAN has been properly established. This makes it possible to avoid the inconvenience that the installation is terminated despite the fact that the connection via the wireless LAN has actually failed.

(3) The setup of each of second and subsequent PCs relating to the wireless LAN, which conventionally required a user to carry out a complicated operation, can be performed more easily, using the USB interface as in the case of the first PC. In short, the second PC can perform the setup of wireless LAN connection in the same procedure as in the first PC. This makes it possible to unify user operations, thereby suppressing the possibility of an erroneous operation in the setup of the wireless LAN connection.

In the above described embodiment, the user selectively depresses any one of the radio buttons on the network installation completion screen (the screen 820 FIG. 9E, the screen 94 in FIG. 12, and the screen 134 in FIG. 14), to thereby select a printer icon (or printer icons) to be generated upon completion of the installation, to thereby generate or delete a printer icon according to the user's selection, but the selection of a printer icon may be performed in different timing.

Figure 17A:
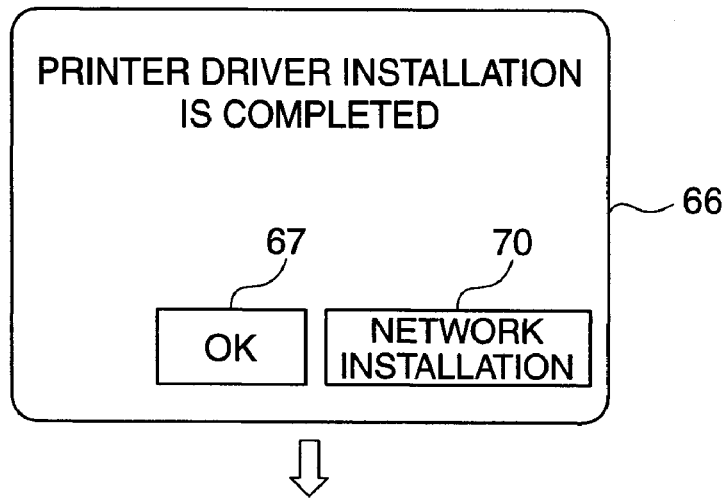
FIG. 17 is a view showing a sequence of screens displayed during execution of a wireless network installation process using the USB interface, according to a variation of the present embodiment.
Figure 17B:
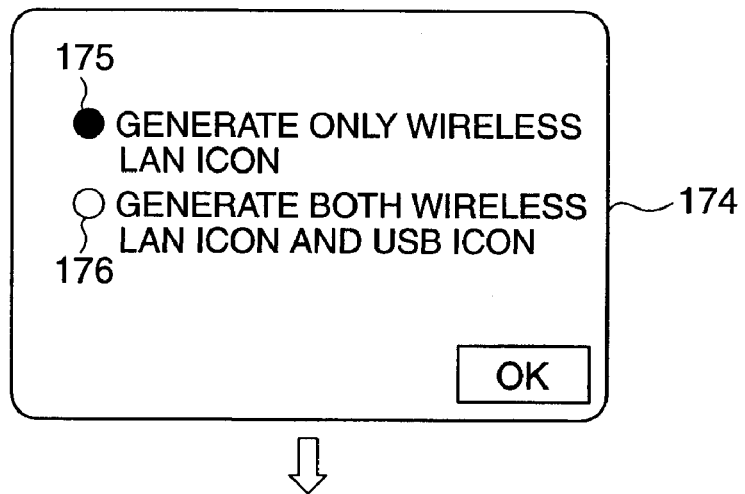
Figure 17C:
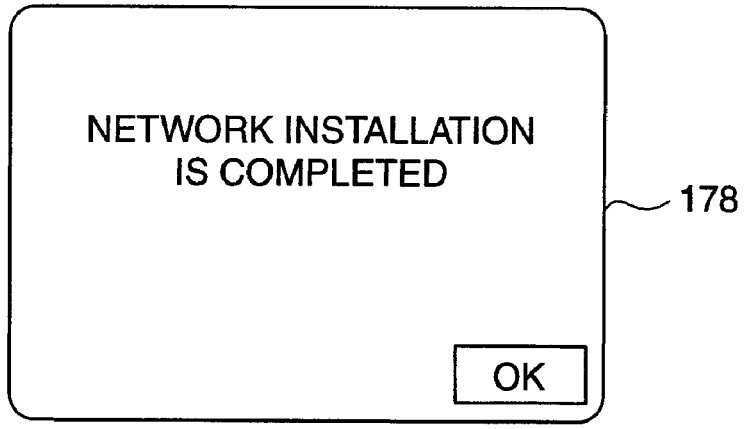

For example, in an example shown in FIG. 17, radio buttons 175 and 176 for use in selecting a printer icon (or printer icons) to be generated upon completion of the installation are displayed at the start of network setup in execution of the wireless network installation process, allowing a user to select one of the radio buttons 175 and 176. After selection by the user, the network installation process is executed, and a completion screen 178 is displayed upon completion of the network installation.

Similarly, deletion of an icon representative of a USB port can be carried out when the USB port has become unnecessary for installation, without awaiting completion of the installation.

The above-described control method can be achieved by storing programs for implementing the flowcharts described hereinabove with reference to FIGS. 3, 7, 13, 15 and 16, in a storage device within a host apparatus, such as the PC 11, and operating the programs.

The present invention is not limited to the apparatus according to the above described embodiment, but it may either be applied to a system composed of a plurality of apparatuses or to a single apparatus.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the above-described embodiment, and hence the program code and the storage medium in which the program code is stored constitute the present invention.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

Further, the above program has only to realize the functions of the above described embodiment on a computer, and the form of the program may be an object code, a program code executed by an interpreter, or script data supplied to an OS.

Examples of the storage medium for supplying the program code include a floppy (registered trademark) disk, a hard disk, an optical disk, a magnetic-optical disk, a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network from another computer, a database or the like, not shown, connected to the Internet, a commercial network, a local area network, or the like.

What is claimed is:

1. An information processing apparatus communicable with at least one device or apparatus having a first interface and a second interface, comprising:
    a first communication setting-executing device that executes a first communication setting for enabling the information processing apparatus to communicate with the device or apparatus via the first interface;
    a second communication setting-executing device that communicates with the device or apparatus via the first interface after execution of the first communication setting, to execute a second communication setting for enabling the information processing apparatus to communicate with the device or apparatus via the second interface;
    a prompting device that prompts, after execution of the second communication setting, a user to confirm whether the information set by the first communicating setting is to be deleted; and
    a deletion device that deletes information set by the first communication setting, in response to confirmation by the user that the information set by the first communication setting is to be deleted.

2. An information processing apparatus as claimed in claim 1, further comprising a display device that displays a display screen for prompting the user to confirm whether the second communication setting is to be executed after execution of the first communication setting by said first communication setting-executing device.

3. An information processing apparatus as claimed in claim 1, wherein said deletion device deletes an icon corresponding to the first communication setting.

4. A method of controlling an information processing apparatus communicable with at least one device or apparatus having a first interface and a second interface, comprising:
    an installation step of installing a device driver as software for enabling the device or apparatus to be controlled via the first interface, in the information processing apparatus;
    a setting processing step of communicating with the device or apparatus via the first interface after installation of the device driver, to execute setting processing for enabling the device or apparatus and the information processing apparatus to communicate with each other via the second interface;
    a prompting step of prompting, after executing the setting processing step, a user to confirm whether the information associated with the device driver is to be deleted, and
    a deletion step of deleting the information associated with the device driver in response to confirmation by the user that the information associated with the device driver is to be deleted.

* * * * *